US011917985B2

(12) United States Patent
Palmby

(10) Patent No.: US 11,917,985 B2
(45) Date of Patent: Mar. 5, 2024

(54) BEEHIVE WITH GROOVED SURFACES

(71) Applicant: BUCKCREEK TRUST, Decatur, GA (US)

(72) Inventor: Nicholas V. Palmby, Decatur, GA (US)

(73) Assignee: BUCKCREEK TRUST, Decatur, GA (US)

( * ) Notice: Subject to any disclaimer, the term of this patent is extended or adjusted under 35 U.S.C. 154(b) by 0 days.

(21) Appl. No.: 17/574,308

(22) Filed: Jan. 12, 2022

(65) Prior Publication Data

US 2023/0217905 A1    Jul. 13, 2023

(51) Int. Cl.
*A01K 47/00* (2006.01)
*A01K 47/06* (2006.01)

(52) U.S. Cl.
CPC .................. *A01K 47/06* (2013.01)

(58) Field of Classification Search
CPC ..................................................... A01K 47/00
See application file for complete search history.

(56) References Cited

U.S. PATENT DOCUMENTS

| 9,300 | A | | 10/1852 | Langstroth | |
|---|---|---|---|---|---|
| 3,110,044 | A | * | 11/1963 | Dullas | A01K 47/00 |
| 8,814,630 | B2 | | 8/2014 | Rittberger | |
| 10,334,816 | B1 | * | 6/2019 | Wilson | A01K 1/02 |
| 2007/0218804 | A1 | * | 9/2007 | Allan | A01K 47/00 449/4 |
| 2016/0192625 | A1 | * | 7/2016 | Santos | A01K 47/02 |
| 2018/0084763 | A1 | * | 3/2018 | Solano | A01K 47/02 |

OTHER PUBLICATIONS

Entomology Today. Propolis Power-Up: Howe Beekeepers Can Encourage Resin Deposits for Better Hive Health, Nov. 28, 2018, 7 Pages (accessed Jan. 12, 2022, at https://entomologytoday.org/2018/11/28/propolis-how-beekeepers-encourage-better-hive-health/).

* cited by examiner

*Primary Examiner* — Joshua J Michener
*Assistant Examiner* — Henry Hooper Mudd
(74) *Attorney, Agent, or Firm* — Smith, Gambrell & Russell, LLP

(57) ABSTRACT

An artificial beehive includes at least one artificial hive chamber for storing a bee colony and/or honey produced by a bee colony; with at least one removable frame stored in the hive chamber, the frame serving as a supporting base for the production of a honeycomb, and being removable from the hive chamber for extraction of honey from the honeycomb; and at least one cover that closes the hive chamber from an external environment. The hive chamber includes at least one interior surface having grooves extending therealong, the grooves having a depth of between about 1 mm and about 6 mm, and arranged in a predetermined and repeatable pattern.

13 Claims, 5 Drawing Sheets

BEEHIVE WITH GROOVED SURFACES

FIELD OF THE INVENTION

The present invention relates to beehives, and in particular beehives having hive chambers with grooved surfaces that promote increased production and storage of propolis for improved health of a bee colony kept in the beehive.

BACKGROUND OF THE INVENTION

Beekeeping has been practiced for thousands of years, with Egyptians having created beehives out of pottery to keep bee colonies for harvesting honey. In more recent times, Langstroth (US 9,300) taught that beehives may be constructed as wooden boxes with removable internal frames on which honeybees may build combs for the storage resources (e.g., brood, pollen, honey, etc.). Conventional beehives, such as that taught by Rittberger (U.S. Pat. No. 8,814,630) continue to adopt many of the teachings of Langstroth, and have taken to constructing beehives with several hive chambers stacked one atop another to form a multi-tiered beehive for increasing the size of the bee colonies and the output of honey.

While conventional beehives prove efficient, there remains a need for improvements for advancing the state of the art, for example, to attain greater health and sustainability of a bee colonies kept in beehives.

SUMMARY OF THE INVENTION

The present invention is inclusive of artificial beehives that comprise at least one artificial hive chamber for storing a bee colony and/or honey produced by a bee colony; with at least one removable frame stored in the hive chamber, the frame serving as a supporting base for the production of a honeycomb, the frame being removable from the hive chamber for extraction of honey from the honeycomb; and at least one cover that closes the hive chamber from an external environment. The hive chamber comprises at least one interior surface having grooves extending therealong, the grooves having a depth of between about 1 mm and about 6 mm, and arranged in a predetermined and repeatable pattern.

Preferably, the hive chamber comprises a front wall, a rear wall, and two side walls, the front wall and the rear wall both having structures formed therein for reception of one or more removable frames in a front-to-rear orientation, with grooves formed along one or more surfaces inside the hive chamber (e.g., interior surfaces of the two side walls and/or front and rear walls; one or more surfaces of the one or more removable frames). The grooves may be formed in a pattern that imitates a natural occurring structure of tree bark, simulating randomness though being predetermined and reproducible. The grooves may also be provided on a planar insert that is fixable to an interior surface of the beehive.

The present invention is also inclusive of methods of making artificial beehives, including processes in which one or more surfaces inside a hive chamber are machined to form grooves therein. Machining may be performed by an automated system comprising a memory that stores a program for forming a predetermined and repeatable pattern of grooves. Such an automated system may be a computer numerical control (CNC) router comprising a memory storing a program for forming the predetermined and repeatable pattern of grooves.

Processes for making artificial beehives may also include forming one or more surfaces from a moldable material using a molding template that has protrusions for concurrently forming grooves in the one or more interior surfaces. Processes for making artificial beehives may also include affixing a planar insert having grooves extending therealong onto one or more surfaces inside a hive chamber.

Both the foregoing general description and the following detailed description are exemplary and explanatory only and are intended to provide further explanation of the invention as claimed. The accompanying drawings are included to provide a further understanding of the invention; are incorporated in and constitute part of this specification; illustrate embodiments of the invention; and, together with the description, serve to explain the principles of the invention.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1:
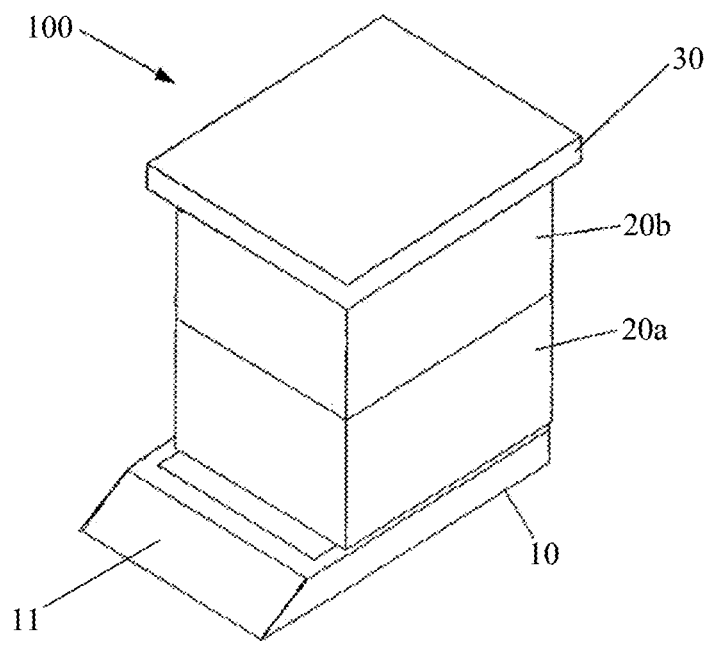
FIG. 1 shows an example of a beehive.

The following disclosure discusses the present invention with reference to the examples shown in the accompanying drawings, though does not limit the invention to those examples.

The use of any and all examples, or exemplary language (e.g., "such as") provided herein is intended merely to better illuminate the invention and does not pose a limitation on the scope of the invention unless otherwise claimed. No language in the specification should be construed as indicating any non-claimed element as essential or otherwise critical to the practice of the invention, unless otherwise made clear in context.

As used herein, the singular forms "a," "an," and "the" include plural referents unless the context clearly dictates otherwise. Unless indicated otherwise by context, the term "or" is to be understood as an inclusive "or." Terms such as "first", "second", "third", etc. when used to describe multiple devices or elements, are so used only to convey the relative actions, positioning and/or functions of the separate devices, and do not necessitate either a specific order for such devices or elements, or any specific quantity or ranking of such devices or elements.

The word "substantially", as used herein with respect to any property or circumstance, refers to a degree of deviation that is sufficiently small so as to not appreciably detract from the identified property or circumstance. The exact degree of deviation allowable in a given circumstance will depend on the specific context, as would be understood by one having ordinary skill in the art.

Use of the terms "about" or "approximately" are intended to describe values above and/or below a stated value or range, as would be understood by one having ordinary skill in the art in the respective context. In some instances, this may encompass values in a range of approx. +/−10%; in other instances, there may be encompassed values in a range of approx. +/−5%; in yet other instances values in a range of approx. +/−2% may be encompassed; and in yet further instances, this may encompass values in a range of approx. +/−1%.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless indicated herein or otherwise clearly contradicted by context.

Recitations of a value range herein, unless indicated otherwise, serves as a shorthand for referring individually to each separate value falling within the stated range, including the endpoints of the range, each separate value within the range, and all intermediate ranges subsumed by the overall range, with each incorporated into the specification as if individually recited herein.

Unless indicated otherwise, or clearly contradicted by context, methods described herein can be performed with the individual steps executed in any suitable order, including: the precise order disclosed, without any intermediate steps or with one or more further steps interposed between the disclosed steps; with the disclosed steps performed in an order other than the exact order disclosed; with one or more steps performed simultaneously; and with one or more disclosed steps omitted.

Honeybees naturally produce a substance resinous substance called propolis, which is a mixture of saliva and beeswax together with plant exudates that the bees gather from trees, flowers, and other botanical sources. The chemical composition and nature of propolis varies depending on location, environmental conditions, and seasonal changes. Honeybees naturally fill grooves, small spaces and any seemingly undesirable openings that they find in a beehive with propolis. It has been observed that propolis is normally used to fill only small gaps of approximately 6 mm or less, while larger gaps of approximately 9 mm or greater are usually filled with burr comb.

Propolis is tacky at temperatures of approximately greater than or equal to 20° C., and hardens at temperatures of approximately less than or equal to 20° C. These temperatures may vary slightly depending on the composition of the propolis. Honeybees use propolis to fill gaps and as a barrier to prevent intruders (e.g., ants, robber bees, etc.) from entering into the beehive, such as through openings between hive chambers. Honeybees also use propolis to regulate temperature of the beehive, depositing propolis to seal off openings and close ventilation and removing propolis to clear openings and permit ventilation, depending on the needs of the colony.

Once hardened, propolis may cause otherwise moveable components of a beehive (e.g., frames, covers, panels, etc.) to become fixedly sealed in placed in a manner that may complicate normal use and maintenance of the beehive. For example, the filling of propolis between a frame and a sidewall of a hive chamber may complicate removal of a frame for extraction of honey, and filling of propolis between an inner cover and a sidewall of a hive chamber may complicate removal of the cover for access to the hive chamber. As such, it is a common practice to take measures for minimizing the production of propolis so as to lessen the likelihood that moveable components of a beehive become locked in place.

Recent studies however suggest there is a correlation between propolis and improved health of a bee colony, and it is now theorized that propolis provides medicinal benefits to a bee colony. Some studies suggest that, with sufficient quantities, propolis can yield an approximate 50% increase to the overall health of a bee colony as compared to a colony with a deficient quantity of propolis. While not being bound by theory, it is believed that propolis has antimicrobial properties that help the colony defend against parasites, and provide the honeybees with natural resources that protect the bees from pathogens, thereby increasing social immunity and mitigating disease in the colony.

Conventionally, artificial beehives are manufactured with hive chambers that are made, for example, through the machining of wood or the casting of plastics. These production methods result in the artificial hive chambers having smooth interior walls, unlike the rough surfaces that bees are accustom to in naturally occurring settings, such as hallowed trees. It has been observed that the smooth surfaces of interior walls in a hive chamber result in a lesser quantity of propolis being produced and stored in the beehive. The present invention addresses this problem, for example, by providing artificial beehives with hive chambers having grooved surfaces that promote the production and storage of increased quantities of propolis, thereby promoting improved health of a bee colony kept therein.

Figure 2:
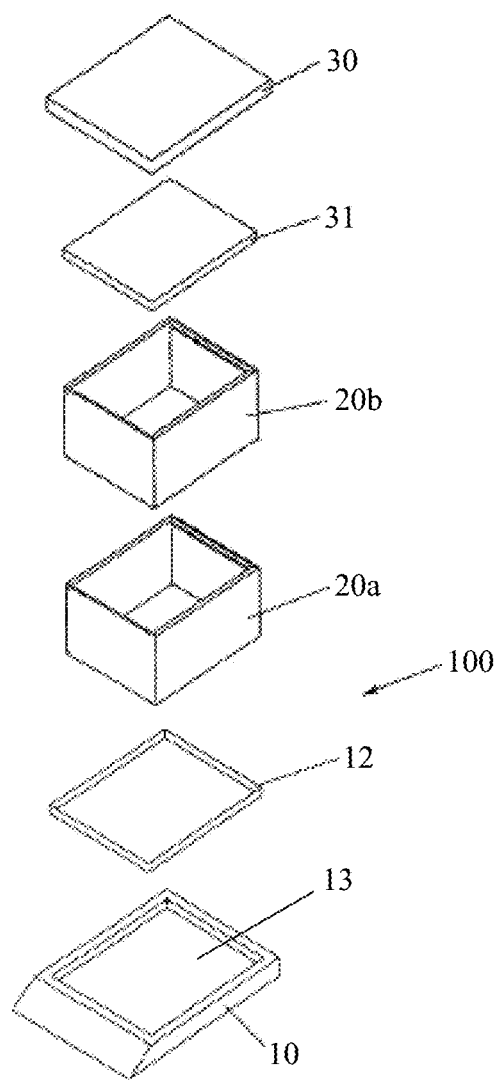
FIG. 2 shows an exploded view of the beehive in FIG. 1.

FIG. 1 shows one example of a beehive 100 according to the present invention. The beehive 11 includes a hive stand 10, first and second hive chambers 20a/20b, and an outer cover 30. FIG. 2 shows an exploded view of the beehive 100.

Figure 3:
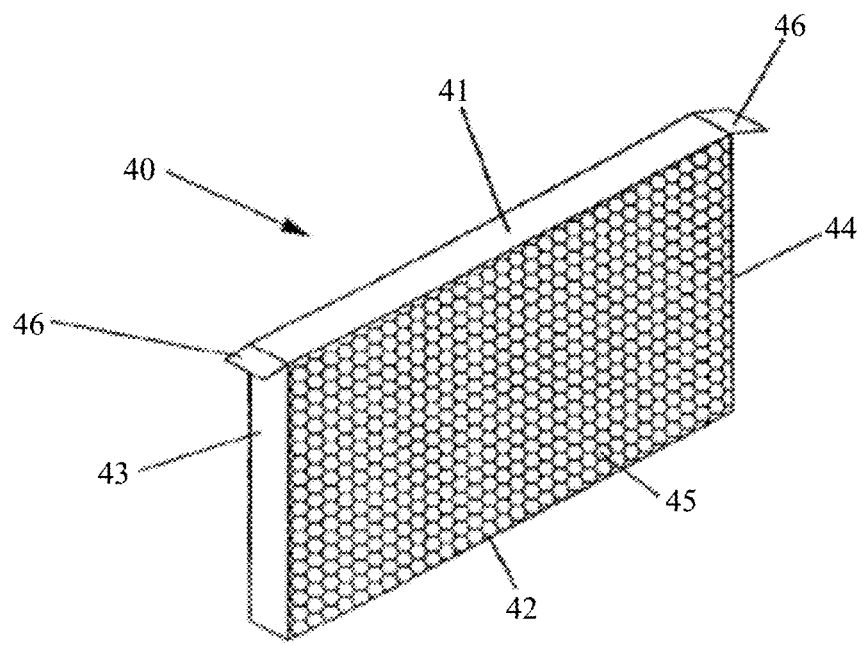
FIG. 3 shows a removable frame of the beehive in FIG. 1.

The hive stand 10 supports the upper components of the beehive 100 and provides a landing ramp 11 for bees to enter the beehive 10 through a bottom board 12 (FIG. 2). The bottom board 12 is dimensioned to fit within an opening 13 of the hive stand 10. The hive chambers 20a/20b are each formed with a front wall, a rear wall, and two side walls with open tops and bottoms. The hive chambers 20a/20b are supported by the hive stand 10, stacked one atop another, with each hive chamber containing several frames 40 (FIG. 3). The uppermost hive chamber 20b is closed by an inner cover 31 that is dimensioned to fit within the top opening of the hive chamber 20b, and the outer cover 30 is placed over the upper most hive chamber 20b. The outer cover 30 closes the beehive 100 from an external environment, and the inner cover 31 provides a barrier between the inner volume of the beehive 100 and the outer cover 30, effectively creating an insulating space between the outer cover 30 and the inner cover 31.

An example of a frame 40 for reception in the hive chambers 20 is shown in FIG. 3. In this example, the frame 40 has a top border 41, a bottom border 42, and two vertical borders 43/44 that extend between the top and bottom borders 41/42. In the illustrated example, the frame 40 is provided with a comb foundation 45 having a honeycomb impression that serves as a supporting base for formation of a honeycomb that the honeybees will use to store honey and from which a beekeeper will extract honey. In other examples, the frame 40 may be provided without a comb foundation 45, leaving the honeybees to construct a honeycomb without a pre-formed supporting base.

In the illustrated example, the frame 40 is provided with ledges 46 that protrude from the top border 41, to hang over the vertical borders 43/44. The ledges 46 are dimensioned to rest in recesses 25/26 (FIG. 4) formed along the top edges of the front and rear walls of a hive chamber 20 such that the frame is suspended within the hive chamber 20 in a front-to-rear orientation. The frame 40 is sized and dimensioned to fit within the hive chambers 20, and is made to be selectively removable and reinsertable through a sliding motion whereby the ledges 46 may be lifted from the recesses formed in the hive chamber walls. In this way, a beekeeper may selectively remove a frame 40 for extraction of honey and then reinsert the emptied frame 40 back in the hive chamber 20 for refilling by the honeybees. In other examples, the ledges 46 may be omitted from the frame 40 and the hive chambers 20 may instead be constructed with vertical channels extending along a height of the front and rear walls with the frames 40 dimensioned for the vertical borders 43/44 to be slideably receivable within the vertical channels.

While the examples herein address a beehive 100 with two hive chambers 20a/20b, it will be understood that beehives according to the present invention may have any number of hive chambers 20, based on the size of the bee colony to be kept therein. Also, though the examples show the hive chambers 20a/20b with rectangular configurations, it will be understood that hive chambers 20 may be constructed with any other suitable shape and dimensions, with frames 40 similarly adapted to a corresponding shape. Though not shown, beehives according to the present invention may include additional structures, such as, though not limited to: one or more separators, such as a queen excluder; and one or more additional chambers of varying dimensions for further storage of a bee colony and/or honey.

Figure 4:
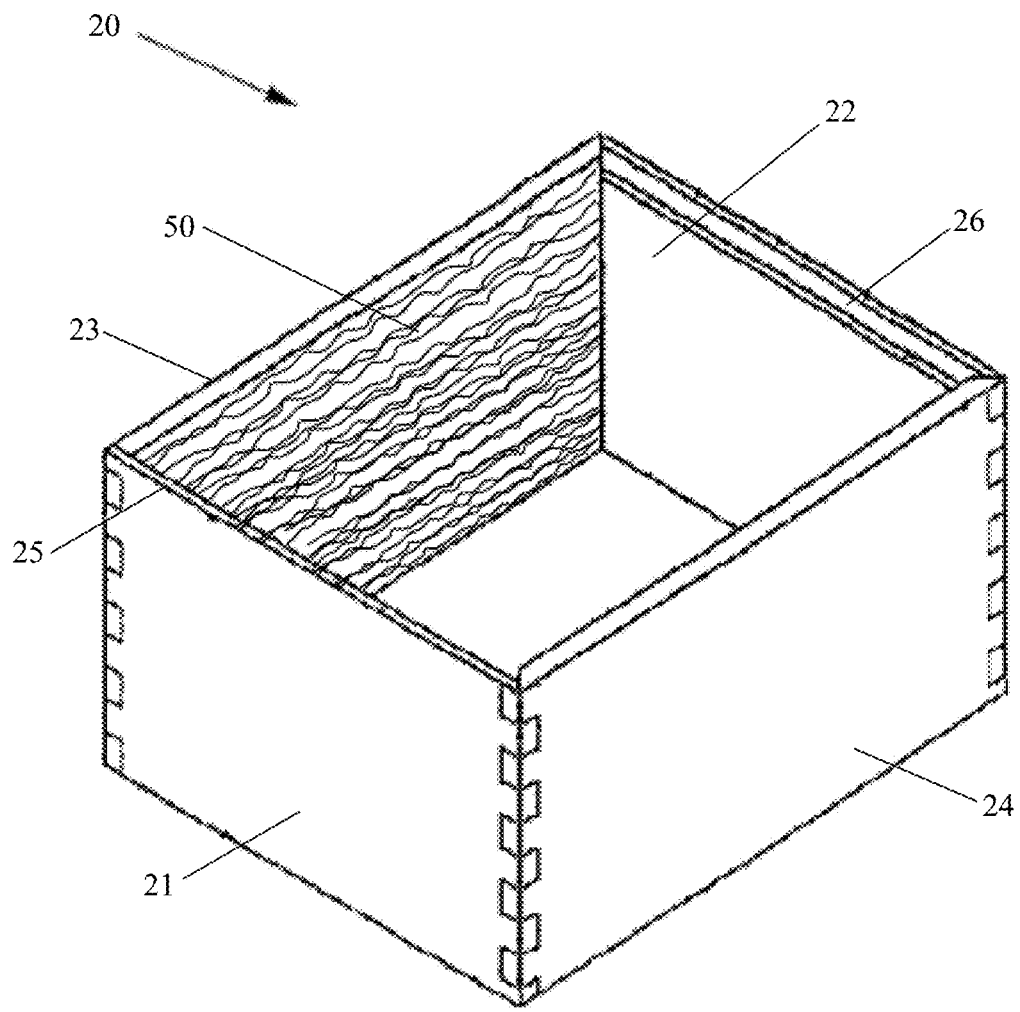
FIG. 4 shows a hive chamber of the beehive in FIG. 1.

FIG. 4 shows an example of a hive chamber 20 with a front wall 21, a rear wall 22, and two side walls 23/24, with an open top and bottom. Recesses 25/26 are formed along the top edges of the front and rear walls 21/22, respectively. Several frames 40 may be received within the hive chamber 20 in a front-to-rear orientation, with the ledges 46 of the frames 40 resting on the recesses 25/26. It will be understood that in other examples the hive chamber 20 may be constructed with vertical channels extending along the height of the front and rear walls 21/22 for sliding reception of frames 40 therein. Preferably, the hive chamber 20 is made to have dimensions that are standard in practice, such as an approximate width and length of 40.5 cm W×50.5 cm L (16 in. W×19⅞ in. L), with height most commonly at one of: 24.5 cm H (9⅝ in. H), 16.8 cm H (6⅝ in. H), or 14.9 cm H (5⅞ in. H). However, the hive chambers 20 may be made to have any preferred size and dimensions as suitable for their intended use.

Figure 5A:
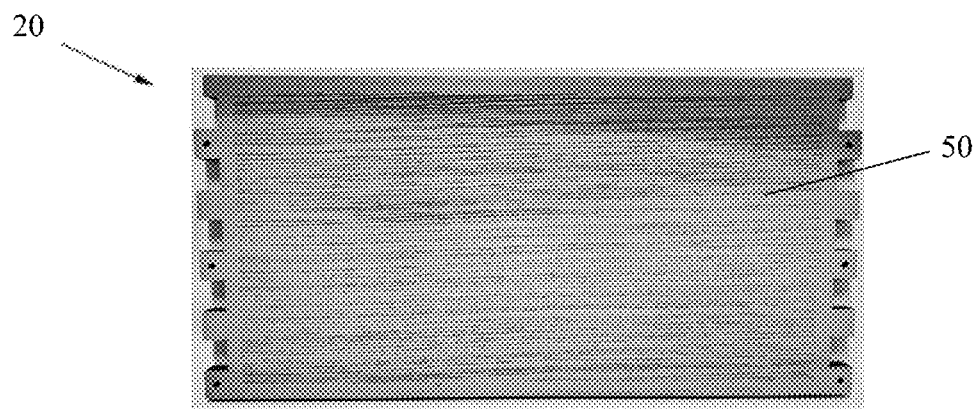
FIG. 5a shows an isolated sidewall of the hive chamber in FIG. 4, with grooves along an interior surface thereof.
Figure 5B:
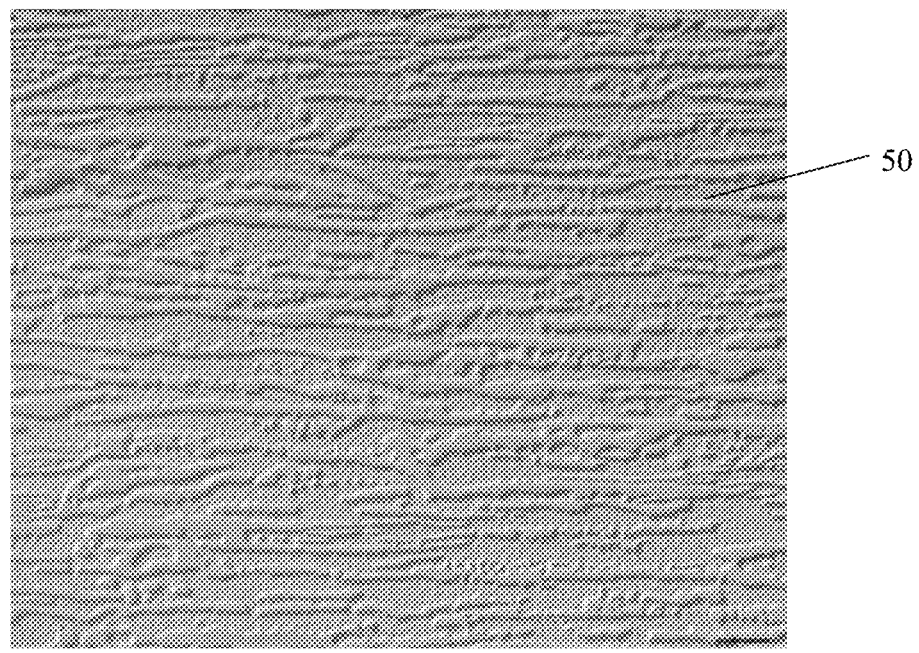
FIG. 5b shows a groove pattern imitating a natural structure in the form of tree bark.

As shown in FIG. 4, the hive chamber 20 is constructed with a plurality of grooves 50 formed along the interior surface of the side wall 23. FIG. 5a shows an isolated view of the side wall 23 and the grooves 50 formed therein. Though not visible in the figure, similar grooves 50 are likewise formed along the interior surface of the sidewall 24. In the illustrated example, the grooves 50 are formed with a horizontal orientation and arranged in an irregular, non-uniform pattern, with the grooves having varying widths, lengths and depths. The grooves are not limited to this configuration, and may be formed with any chosen orientation and may also be made with a uniform pattern as well as uniform dimensions of width, length and/or depth. In some examples, the grooves 50 may be formed with a repeating pattern that simulates randomness, but which is in fact predetermined and reproducible. FIG. 5b shows one such example, in which the grooves 50 are arranged in a predetermined and reproducible pattern that imitates the appearance of a naturally occurring structure in the form of tree bark.

The grooves 50 are made with a depth of approximately 1 mm to 6 mm, and with a width of approximately 1 mm to 6 mm. Though, in the interest of increasing the amount of propolis that may be stored therein, it is preferable that the grooves 50 be made with a depth of approximately 3 mm to 6 mm, and with a width of approximately 3 mm to 6 mm. It is preferable that the grooves 50 cover a substantial portion of the inner surfaces of the hive chamber 20, with there being approximately 3.5 to 15 grooves per inch of surface area in a grooved pattern. In a grooved pattern comprising grooves of approximately 1 mm in width, it is preferable that there are approximately 12 to 15 grooves per inch of surface area; and in a grooved pattern comprising grooves of approximately 6 mm in width, it is preferable that there are approximately 3.5 to 4 grooves per inch of surface area.

Figure 6:
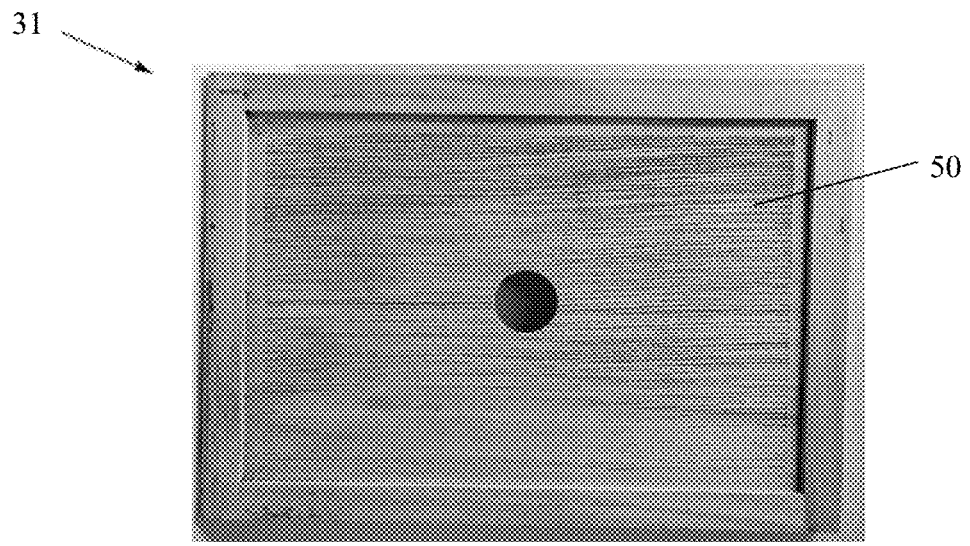
FIG. 6 shows an inner cover of the beehive in FIG. 1, with grooves along an interior surface thereof.

In the illustrated example, groves 50 are not formed along the interior surface of either the front wall 21 or the rear wall 22. This is preferable if wishing to lessen the likelihood that the honeybees fill a gap between the rear/front walls 21/22 and the vertical borders 43/44 of any frames 40 suspended in the hive chamber 20. In other examples, the frames 40 may be constructed with a length that provides a slight clearance (e.g., approximately 1 mm) between the rear/front walls 21/22 and the vertical borders 43/44 of the frames 40, in which instance grooves 50 may then be provided along the interior surfaces of the front/rear walls 21/22 without considerable risk that the frames 40 will become sealed in place by the deposit of propolis at the front/rear walls 21/22. As shown in FIG. 6, the inner cover 31 may also be provided with grooves 50 formed along an interior surface thereof. As seen in FIGS. 4-6, when formed on an interior surface of a hive chamber 20, an inner cover 31, or any other interior surface of a beehive 100, the grooves 50 may be made to cover substantially the entirety of the respective surface. Grooves 50 may also be provided along an interior surface of the bottom board 12 as well as any available surface of frames 50 (e.g., borders 41-44) within a hive chamber 20. When providing grooves 50 on a frame 40, it is preferable there be a non-grooved space (e.g., approximately 1 mm) between the grooves 50 and any edge of the frame 40 intended to contact an interior surface of the hive chamber 20, so as to reduce the likelihood that propolis is produced in a location that might seal the frame 40 to an interior surface of the hive chamber 20.

Grooves 50 may be formed in a surface in a number of ways, with the manner for formation varying depending on the construction of the respective surface. In examples where the hive chamber 20 is constructed of wood, the grooves 50 may be formed through machining of the surface, for example, by a milling or etching, which may include use of hand-operated tools and machines or automated machines such as a computer numerical control (CNC) router. In examples where the hive chamber 20 is constructed of plastic, the grooves 50 may likewise be formed through machining of the surface, though may instead be formed concurrently with molding of the plastic part through use of a mold template having corresponding protrusions along the respective surface(s).

Figure 7:
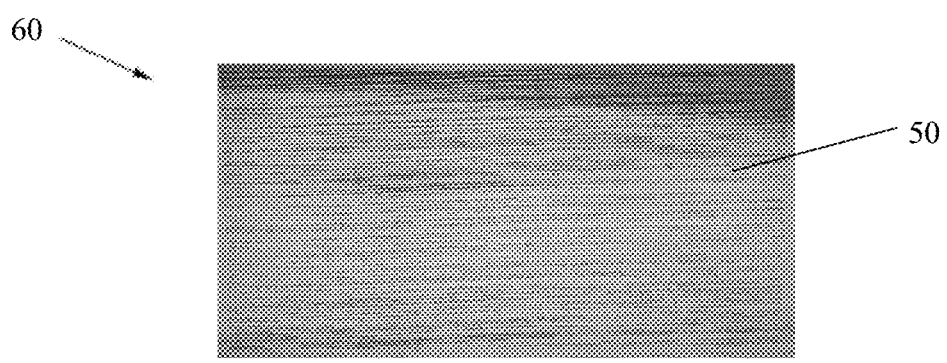
FIG. 7 shows a planar insert of the beehive in FIG. 1, with grooves along a surface thereof.

In another example, the grooves 50 may be formed on one or more sheet-like planar inserts 60, that are formed separately from any component of the beehive 100, and one or more planar inserts 60 may then be affixed to interior surfaces of the beehive 100 as desired with one or more fixing means. FIG. 7 shows an example of a planar insert 60 with grooves 50 formed along a surface thereof. Non-limiting example of fixing means include: adhesives; staples, nails, screws, etc. The planar insert 60 may be made of any suitable material, including wood and plastic, and the grooves 50 may be formed in the planar insert 60 in any suitable manner, including those discussed above for the formation of grooves 50 directly into the surfaces of the hive chamber 20. Planar inserts 60 with grooves 50 provide a significant benefit in that they may be readily used to retrofit pre-exiting beehives to add grooves along any desired surface.

Although the present invention is described with reference to particular embodiments, it will be understood to those skilled in the art that the foregoing disclosure addresses exemplary embodiments only; that the scope of the invention is not limited to the disclosed embodiments; and that the scope of the invention may encompass additional embodiments embracing various changes and modifications relative to the examples disclosed herein without departing from the scope of the invention as defined in the appended claims and equivalents thereto.

To the extent necessary to understand or complete the disclosure of the present invention, all publications, patents, and patent applications mentioned herein are expressly incorporated by reference herein to the same extent as though each were individually so incorporated.

The present invention is not limited to the exemplary embodiments illustrated herein, but is instead characterized by the appended claims, which in no way limit the scope of the disclosure.

What is claimed is:

1. An artificial beehive comprising:
   at least one artificial hive chamber for storing a bee colony and/or honey produced by a bee colony, the hive chamber comprising a front wall, a rear wall, and two side walls;
   at least one removable frame releasably supported on a frame reception structure within the hive chamber, the frame reception structure provided along the front wall and the rear wall of the hive chamber for reception of the removable frame in a front-to-rear orientation, the frame serving as a supporting base for the production of a honeycomb and being removable from the hive chamber for extraction of honey from the honeycomb; and
   at least one cover that closes the hive chamber from an external environment, wherein
   the hive chamber comprises a grooved pattern extending along interior surfaces of at least the two side walls, grooves in the grooved pattern having a depth of between about 1 mm and about 6 mm and a width of about 1 mm and about 6 mm, and
   the grooved pattern is spaced apart from the frame reception structure, with the grooves in the grooved pattern arranged in a predetermined and repeatable pattern.

2. The artificial beehive according to claim 1, wherein the grooved pattern is further provided along interior surfaces of the front and rear walls of the hive chamber, with spacing between the grooved pattern and the frame reception structure.

3. The artificial beehive according to claim 1, wherein the grooved pattern is formed in the interior surfaces of the at least two side walls.

4. The artificial beehive according to claim 1, wherein the grooved pattern imitates a natural occurring structure of tree bark.

5. The artificial beehive according to claim 1, wherein the grooved pattern is provided on a planar insert that is fixed to the interior surfaces of the at least two side walls.

6. A method of making an artificial beehive according to claim 1, comprising:
   machining the interior surfaces of the at least two side walls of the hive chamber to form the grooved pattern in the interior surfaces of the at least two side walls.

7. The method according to claim 6, wherein
   machining of the interior surfaces of the at least two side walls is performed with an automated system comprising a memory that stores a program for forming the predetermined and repeatable pattern of grooves.

8. The method according to claim 7, wherein
   the automated system is a computer numerical control router comprising a memory storing a program for forming the predetermined and repeatable grooved pattern.

9. A method of making an artificial beehive according to claim 1, comprising:
   forming the interior surfaces of the at least two side walls of the hive chamber from a moldable material using a molding template having protrusions for concurrently forming the grooved pattern in the interior surfaces of the at least two side walls.

10. A method of making an artificial beehive according to claim 1, comprising:
    affixing a planar insert having the grooved pattern extending therealong onto the interior surfaces of the at least two side walls of the hive chamber.

11. The artificial beehive according to claim 1, wherein the grooved pattern comprises approximately 3.5 to 15 grooves per square inch.

12. The artificial beehive according to claim 1, wherein the grooved pattern comprises grooves having a width of approximately 1 mm, with approximately 12 to 15 grooves per square inch.

13. The artificial beehive according to claim 1, wherein the grooved pattern comprises grooves having a width of approximately 6 mm, with approximately 3.5 to 4 grooves per square inch.

* * * * *